Patented Nov. 17, 1931

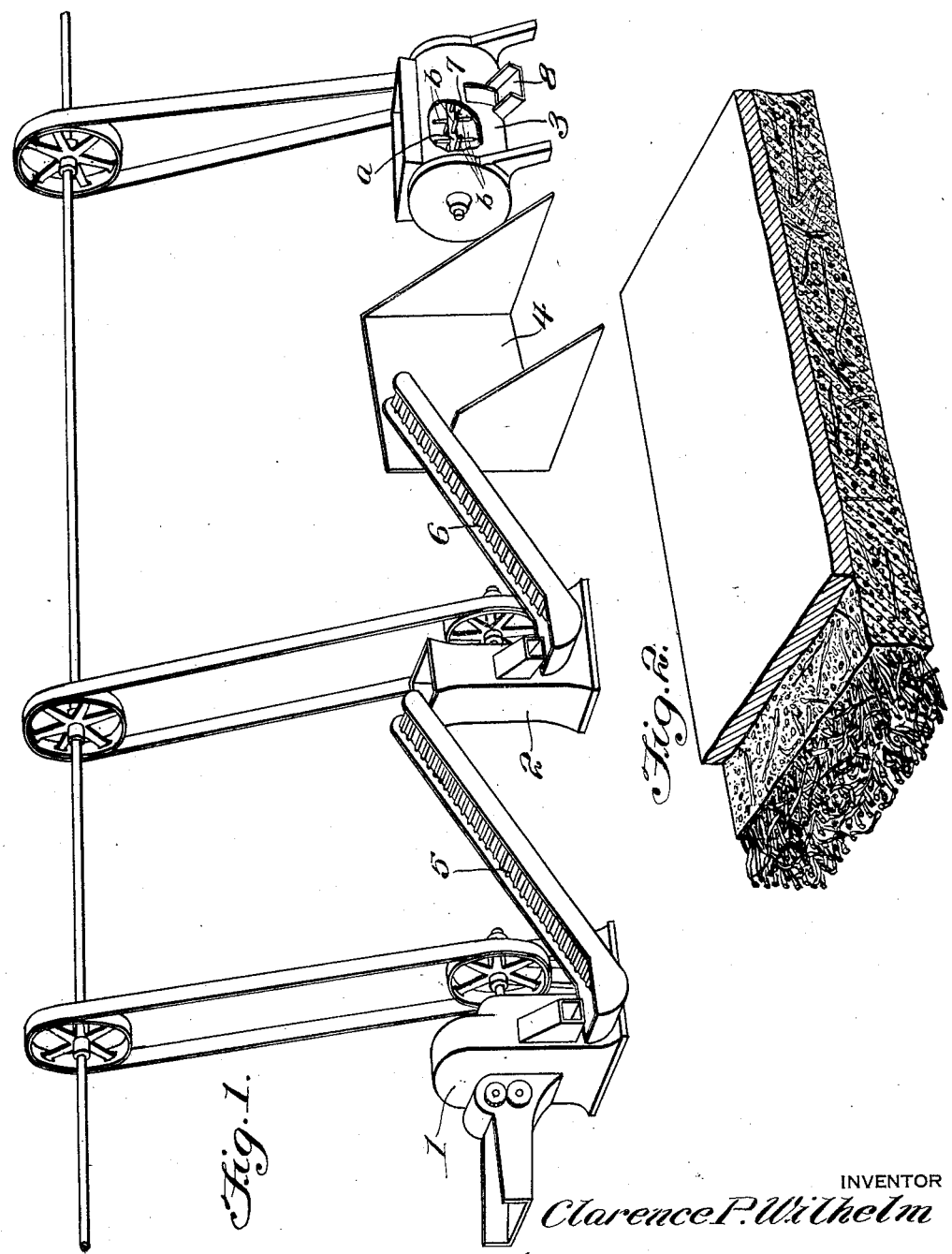

1,831,984

UNITED STATES PATENT OFFICE

CLARENCE P. WILHELM, OF PUNTA GORDA, FLORIDA

BUILDING MATERIAL

Application filed February 14, 1928. Serial No. 254,294.

It is the purpose of my invention to provide a cheap and effective building material composed as to its base of wild products, not only ordinarily useless but detrimental to the land upon which it grows and requiring to be dug up and burned in order to permit the land to be utilized for farming or gardening. This base material is the well known palmetto which grows luxuriantly in Florida and other semi-tropical and tropical countries. I may also utilize the cabbage palm which has hitherto been a waste product, but the fiber is not as good.

I prepare this base for use by disintegrating the material both as to its roots and body above and below ground, primarily cutting the material into sections and then separating the sections into fibers which is readily done in a mill adapted to tear the sections apart. The fiber resulting from this separating treatment carries with it a binder in the form of a dust or powder and this may be sifted out of the fiber and utilized as a base material where finer qualities of work are necessary, as for instance in molding. This dust is also fibrous and adheres to the mixture utilized in the formation of the completed article.

The fibrous material is very tough and durable and is exceedingly cheap. I aim to so treat it as to make it fire proof and water proof so that the completed building material will present a surface practically indestructible to the ordinary elements of water and fire and thus furnish a building material desirable as to its wearing and resisting qualities and produced at a minimum of cost.

I do not limit myself as to this specific use of the material as it may be made in plastic form and applied with a trowel; it may be molded into sheets; shingles; laths; or into any of the many forms desirable in building material.

In the accompanying drawings:

Fig. 1 shows a diagrammatic view of a cutting machine for the roots; disintegrating mill; and a mixer, with carrying belts between.

Fig. 2 is a section of the finished product showing a surface coating thereon.

In Florida there are vast quantities of the palmetto and cabbage palm unused and constituting a wild waste product and yet this material produces a wonderfully tough and durable fiber easily obtained by cutting into sections and then separating the sections into fiber.

This material is of course combustible but I aim to utilize it as a cheap base and so treat it that it will be covered and encased in a fire and water proofing material which at the same time will be made tough without being brittle.

In Figure 1 part 1 shows a cutting machine which reduces the roots to the desired length and a belt 5 for carrying the sections to a disintegrating machine 2. This disintegrating machine 2 reduces the sections to fibrous form and the fiber is carried by a belt 6 to a bin 4. A mixing machine is shown at 3 having stirring means 7. The mixer 3 is a batch mixer and enables me to prepare various mixes according to requirement of the articles made. The mixer 3 has a discharge mouth 8 for discharging into any suitable container or mold.

After the fiber is produced and in the bin 4 and without any preliminary treatment such as cooking or the like, I mix with it in the mixer B calcined magnesite in powdered form in the proportion of one part of calcined magnesite to nine parts of fiber, also I then place in the mixer, magnesium chloride with water added until it tests 25° Baumé, which will give with the fiber a moulding consistency. The mixing mill is composed of a hopper with a central horizontal shaft $a$ arranged therein and this shaft has steel projections $b$ relatively small in diameter so that in rotation these steel stirrers will thoroughly mix the fiber with the magnesite and the fiber becomes coated and completely covered and encased. It is important that this stirring action be of a character to coat the individual fibers so that they become embedded in the mass and thus the fibers are protected against the action of the elements to which the magnesite is impervious. The magnesium chloride has the effect of setting the magnesite, and in order to remove the known brittleness of the magnesite binder and toughen it I use lime in the mixture in the proportion of one-half part of lime to one part of magnesite.

The mixture as it comes from the mixing hopper may be molded into any form or shape and an outer coating may be added mixed with coloring matter and this surface may be glazed in the ordinary way, or the molded articles may be dipped and the joints between the articles when used as shingles or building blocks may be filled in by brushing or trowelling. If the dust is used independently of the fiber it may be treated in exactly the same way, the result being a product of finer texture.

The material is so tough and so lacking in brittleness that it may be used with ordinary nails and is capable of being sawed like wood. One advantage of my improved process and formula is that it can be successfully carried out by an inexperienced person.

Whiting is an equivalent for the lime described.

What I claim is:

A building material comprising a fibrous base of palmetto fibre, a binder consisting of calcined magnesite, magnesium chloride for setting the magnesite, and lime for removing the brittleness and toughening the magnesite binder, in the proportions of one part of calcined magnesite to nine parts of fibre, and one-half part of lime to one part of calcined magnesite.

In testimony whereof, I affix my signature.

CLARENCE P. WILHELM.